(12) United States Patent
Strobel et al.

(10) Patent No.: US 11,358,235 B2
(45) Date of Patent: Jun. 14, 2022

(54) DEVICE FOR WELDING ROD-SHAPED ELECTRICAL CONDUCTORS AND SONOTRODE FOR SUCH A DEVICE

(71) Applicant: Schunk Sonosystems GMBH, Wettenberg (DE)

(72) Inventors: Heiko Strobel, Muenzenberg (DE); Sebastian Ruehl, Wetter (DE); Manuel Fey, Blasbach (DE); Dennis Tobias Kaemmerer, Wettenberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 111 days.

(21) Appl. No.: 16/611,960

(22) PCT Filed: May 7, 2018

(86) PCT No.: PCT/EP2018/061735
§ 371 (c)(1),
(2) Date: Nov. 8, 2019

(87) PCT Pub. No.: WO2018/210603
PCT Pub. Date: Nov. 22, 2018

(65) Prior Publication Data
US 2021/0146470 A1    May 20, 2021

(30) Foreign Application Priority Data
May 15, 2017   (DE) .................... 10 2017 208 164.3

(51) Int. Cl.
*B23K 20/10*    (2006.01)
*B23K 20/22*    (2006.01)
(Continued)

(52) U.S. Cl.
CPC ............ *B23K 20/106* (2013.01); *B23K 20/22* (2013.01); *H01R 43/0207* (2013.01); *B23K 2101/38* (2018.08); *H01R 4/021* (2013.01)

(58) Field of Classification Search
CPC ............ B23K 20/10–106; B23K 20/22; B23K 2101/38; B23K 2101/32; B23K 1/06; H01R 43/0207; H01R 4/021
See application file for complete search history.

(56) References Cited

U.S. PATENT DOCUMENTS 4,869,419 A * 9/1989 Nuss .................... B23K 20/106
228/110.1
5,642,852 A * 7/1997 Suzuki .................. B23K 20/10
228/110.1
(Continued)

FOREIGN PATENT DOCUMENTS

CN    105555461 A    5/2016
CN    105900297 A    8/2016
(Continued)

Primary Examiner — Kiley S Stoner
(74) Attorney, Agent, or Firm — Dickinson Wright PLLC; Andrew D. Dorisio

(57) ABSTRACT

A device for welding rod-shaped electrical conductors and a sonotrode for such includes a compression space for receiving two connection regions of the conductors to be connected, said connection regions extending in a first axial direction (x-axis), the compression space being defined by a working surface of a sonotrode, which transmits ultrasonic vibrations, and a counterface of an anvil at two opposite sides in a second axial direction (z-axis) and by a boundary surface of a slider element, displaceable in the second axial direction (z-axis), and a boundary surface of a boundary element on two opposite sides in a third axial direction (y-axis). In a special contact zone, which is a section of the working surface of the sonotrode and serves to subject at least one connection region to ultrasonic vibrations, the
(Continued)

working surface has a surface configuration that differs from a contact zone formed by the remaining working surface.

17 Claims, 7 Drawing Sheets

(51) Int. Cl.
  *H01R 43/02* (2006.01)
  *B23K 101/38* (2006.01)
  *H01R 4/02* (2006.01)

(56) References Cited

U.S. PATENT DOCUMENTS

| | | | | |
|---|---|---|---|---|
| 6,299,052 | B1 * | 10/2001 | Wnek | B23K 20/10 |
| | | | | 228/110.1 |
| 7,337,938 | B2 * | 3/2008 | Noro | B23K 20/106 |
| | | | | 156/580.1 |
| 7,878,384 | B2 * | 2/2011 | Eberbach | B23K 20/106 |
| | | | | 228/1.1 |
| 9,496,670 | B2 * | 11/2016 | Wagner | B06B 3/00 |
| 2004/0020580 | A1 | 2/2004 | Oishi et al. | |
| 2006/0169388 | A1 | 8/2006 | Shimizu et al. | |
| 2007/0257088 | A1 * | 11/2007 | Steiner | H01L 24/85 |
| | | | | 228/110.1 |
| 2008/0128471 | A1 * | 6/2008 | Eberbach | B23K 20/106 |
| | | | | 228/1.1 |
| 2015/0288123 | A1 * | 10/2015 | Wagner | H01R 4/02 |
| | | | | 228/110.1 |
| 2016/0116355 | A1 * | 4/2016 | Stroh | D07B 1/06 |
| | | | | 702/43 |
| 2019/0052040 | A1 * | 2/2019 | Suzuki | H01R 43/02 |
| 2020/0070431 | A1 * | 3/2020 | Nakano | H01M 50/463 |

FOREIGN PATENT DOCUMENTS

| | | | | |
|---|---|---|---|---|
| DE | 102005004899 A1 * | 8/2006 | | B23K 20/106 |
| DE | 102012111734 A1 * | 6/2014 | | H01R 4/029 |
| JP | 2014179435 A | 9/2014 | | |
| JP | 2016524279 A | 8/2016 | | |

\* cited by examiner

Fig. 1
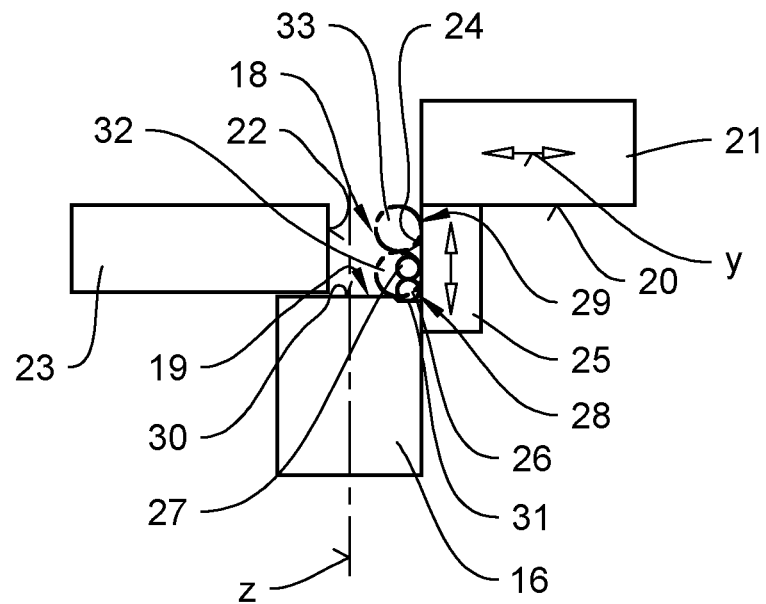
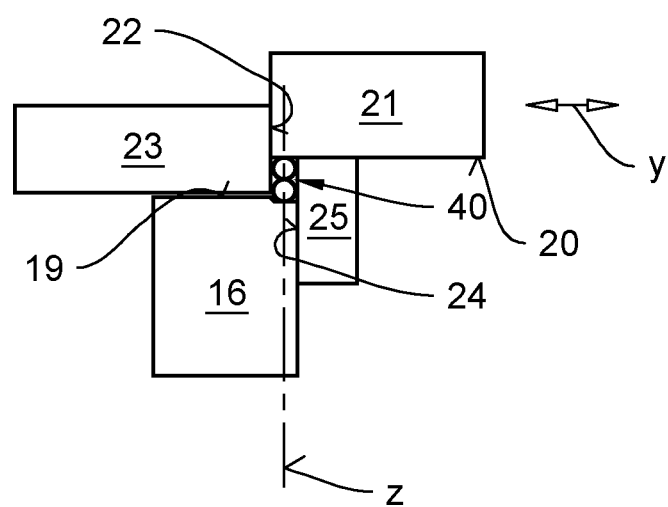
Fig. 2

DEVICE FOR WELDING ROD-SHAPED ELECTRICAL CONDUCTORS AND SONOTRODE FOR SUCH A DEVICE

FIELD OF THE INVENTION

The present invention relates to a device for welding rod-shaped electrical conductors. Moreover, the invention relates to a sonotrode which is particularly suitable for such a device.

BACKGROUND OF THE INVENTION

Devices of the aforementioned kind have a compression space which serves to produce an ultrasonic weld between connection regions of conductors, electrical conductors whose connection regions may differ widely in diameter being connected using one and the same device in practice. All conductors are handled in the same manner essentially irrespective of the different diameters of their connection regions, said handling consisting in the connection regions being placed in the open compression space and, after closing of the compression space, a contact area between the working surface of the sonotrode and at least the bottom connection region of two conductors stacked on top of each other being formed as a function of the diameter of the connection region.

To transmit the ultrasonic vibrations from of the sonotrode to the connection regions, the working surface is provided with a profiled surface configuration in which profile elevations extend perpendicular to the longitudinal axis of the sonotrode on the working surface. When the connection regions of the conductors are very small in diameter, in particular, it was found that the profile elevations may lead to excessive mechanical stress on the connection regions, which becomes evident in the finished weld in that the ideally possible weld strengths are not reached.

DESCRIPTION OF THE INVENTION

Hence, the object of the present invention is to propose a device for welding rod-shaped electrical conductors and a sonotrode employed in the process which allow an ultrasonic weld of high weld strength to be produced even between connection regions of small and smallest diameters.

In a special contact zone, which is a section of the working surface of the sonotrode and which serves to subject at least one connection region to ultrasonic vibrations, the working surface of the sonotrode of the device according to the invention has a surface configuration that differs from a contact zone formed by the remaining working surface.

The device according to the invention and the sonotrode according to the invention allow ultrasonic welds to be produced both between electrical conductors having medium and large wire diameters and between electrical conductors having small and smallest wire diameters using one and the same device and one and the same sonotrode.

According to the invention, providing the working surface with different configurations, i.e. dividing the working surface into a contact zone designed to come into contact with medium and large wire diameters and a special contact zone designed to come into contact with small and smallest wire diameters, achieves ideal ultrasonic treatment of different wire diameters using one and the same device and one and the same sonotrode.

As a result, the special contact zone can be completely effective in small welded connectors and damage to the wires or conductors caused by the profile elevations can be avoided, whereas conductors having wires of greater diameters are substantially in contact with the "normal" profile in the contact zone of the working surface, allowing greater forces to be transmitted.

Smallest and small conductor cross-sections can thus be subjected to a "tamer" profile of the working surface in the special contact zone and medium and large conductor cross-sections can be subjected to the "sharp" profile in the contact zone in order to make equally ideal weld strengths possible irrespective of the conductor cross-section.

Preferably, the special contact zone is disposed adjacent to the boundary element so that when a compression space is closed, i.e. the slider element is displaced against the boundary surface of the boundary element in the direction of the y-axis as far as the connection regions of the conductors disposed in-between allow, the connection regions settle in the special contact zone as desired.

This is the case in particular if the special contact zone is formed on a working surface edge of the working surface of the sonotrode that is parallel to the boundary element.

Preferably, the contact zone has a surface configuration comprising profile elevations which extend in the third axial direction and at least some of which have a special profile cross-section in the area of the special contact zone, said special profile cross-section differing from the profile cross-section in the contact zone.

A particularly simple realization of the special contact zone is possible if the special profile cross-section has a reduced profile height compared to the profile cross-section.

Preferably, the reduced profile height is formed by a flattened portion or a rounded portion of a profile peak of the profile cross-section, allowing the special contact zone to be formed by partial material removal after production of the working surface of the sonotrode, in particular in the case of the flattened portion.

At least in a middle portion extending in the first axial direction, the special contact zone preferably has a special contact portion symmetric with respect to an axis of symmetry running parallel to the third axial direction, the special contact zone being symmetric across its entire length in an embodiment of the special contact zone that is particularly simple to produce.

A contact zone disposed symmetrically in the working surface becomes possible if the axis of symmetry is formed by a centerline of the working surface, said centerline running parallel to the third axial direction, an embodiment of this kind being particularly suitable for producing a continuous connection between two conductors in which the connection regions of the conductors to be connected extend in opposite directions across the centerline while overlapping each other.

Tests have shown that it has a particularly positive effect on the achievable weld quality, in particular of the overlapping conductors extending in opposite directions, when at least one profile elevation formed in the area of the axis of symmetry extends across the entire width of the working surface and is preferably constant, i.e. when the constant profile elevation divides the special contact zone into two subzones in the longitudinal direction of the sonotrode, i.e. in the direction of the x-axis.

It is also particularly advantageous if the special contact zone extends across only part of the length of the contact zone in the first axial direction.

If the special contact zone is disposed asymmetrically with respect to a centerline of the working surface, said centerline running parallel to the third axial direction, the device is particularly suitable for producing a weld between overlapping connection regions of two conductors extending in the same direction.

If the special contact zone is additionally disposed toward a working surface end, the configuration of a section of the contact zone for forming the special contact zone can be limited to a small peripheral working surface region, whereby a "placement side" of the sonotrode working surface, i.e. the side of the sonotrode working surface on which the connection regions of the conductors to be connected are placed in the compression space, can simultaneously be defined.

Preferably, the special contact zone has a width of less than 2 mm in the third axial direction.

Particularly preferably, the special contact zone has a width of less than 1.5 mm in the third axial direction. In special cases, i.e. in particular when especially small wire diameters are to be connected to each other, it was found advantageous for the special contact zone to have a width of less than 1 mm in the third axial direction.

To attain the object of the invention, the sonotrode according to the invention has a working surface which has, in a special contact zone, which is a section of the working surface and which serves to subject at least one connection region of an electrical conductor to ultrasonic vibrations, a surface configuration that differs from a contact zone formed by the remaining working surface.

Preferably, the special contact zone extends in the direction of a longitudinal axis of the sonotrode.

Particularly preferably, the special contact zone is formed on a working surface edge of the sonotrode.

If the contact zone has a surface configuration comprising profile elevations which extend perpendicular to the longitudinal direction of the sonotrode and which have a special profile cross-section, which differs from the profile cross-section in the contact zone, in the area of the special contact zone, the special contact zone can be configured in a particularly simple fashion.

Particularly preferably, the special profile cross-section has a reduced profile height compared to the profile cross-section.

Furthermore, the reduced profile height is preferably formed by a flattened portion or a rounded portion of a profile peak of the profile cross-section.

Preferably, the special contact zone has a special contact portion which is symmetric with respect to an axis of symmetry extending parallel to a transverse axis in at least a middle portion extending in the direction of the longitudinal axis.

In a particularly preferred embodiment, the special contact zone is symmetric across its entire length.

If the axis of symmetry is formed by a centerline of the working surface, said centerline running parallel to the transverse axis, the sonotrode is particularly suitable for producing a connection between connection regions of conductors that extend in opposite directions.

Preferably, at least one profile elevation formed in the area of the axis of symmetry extends across the width of the working surface, the profile elevation being particularly preferably constant.

If the special contact zone extends across only part of the length of the contact zone in the direction of the longitudinal axis, formation of the special contact zone can be limited to the area of overlap of the conductors that actually forms when the connection regions are made to overlap.

In particular when a connection between connection regions of two conductors extending in the same direction is to be produced, it is advantageous for the special contact zone to be disposed asymmetrically with respect to a centerline of the working surface, said centerline running parallel to the transverse axis.

Preferably, the special contact zone is disposed toward a working surface end in that case.

In a preferred embodiment of the sonotrode, the special contact zone has a width of less than 2 mm in the direction of the transverse axis.

Particularly advantageously, the special contact zone has a width of less than 1.5 mm in the direction of the transverse axis; moreover, in the case of conductors having a particularly small diameter, it is advantageous for the special contact zone to have a width of less than 1 mm in the direction of the transverse axis.

BRIEF DESCRIPTION OF THE DRAWING FIGURES

Hereinafter, preferred embodiments of the device and of the sonotrode are explained in more detail based on the drawing.

FIG. 1 shows a front view of an open compression space of an ultrasonic welding device with two stacked connection regions of conductors to be welded together;

FIG. 2 shows a closed configuration of the compression space illustrated in FIG. 1;

DETAILED DESCRIPTION OF THE INVENTION

Figure 3:
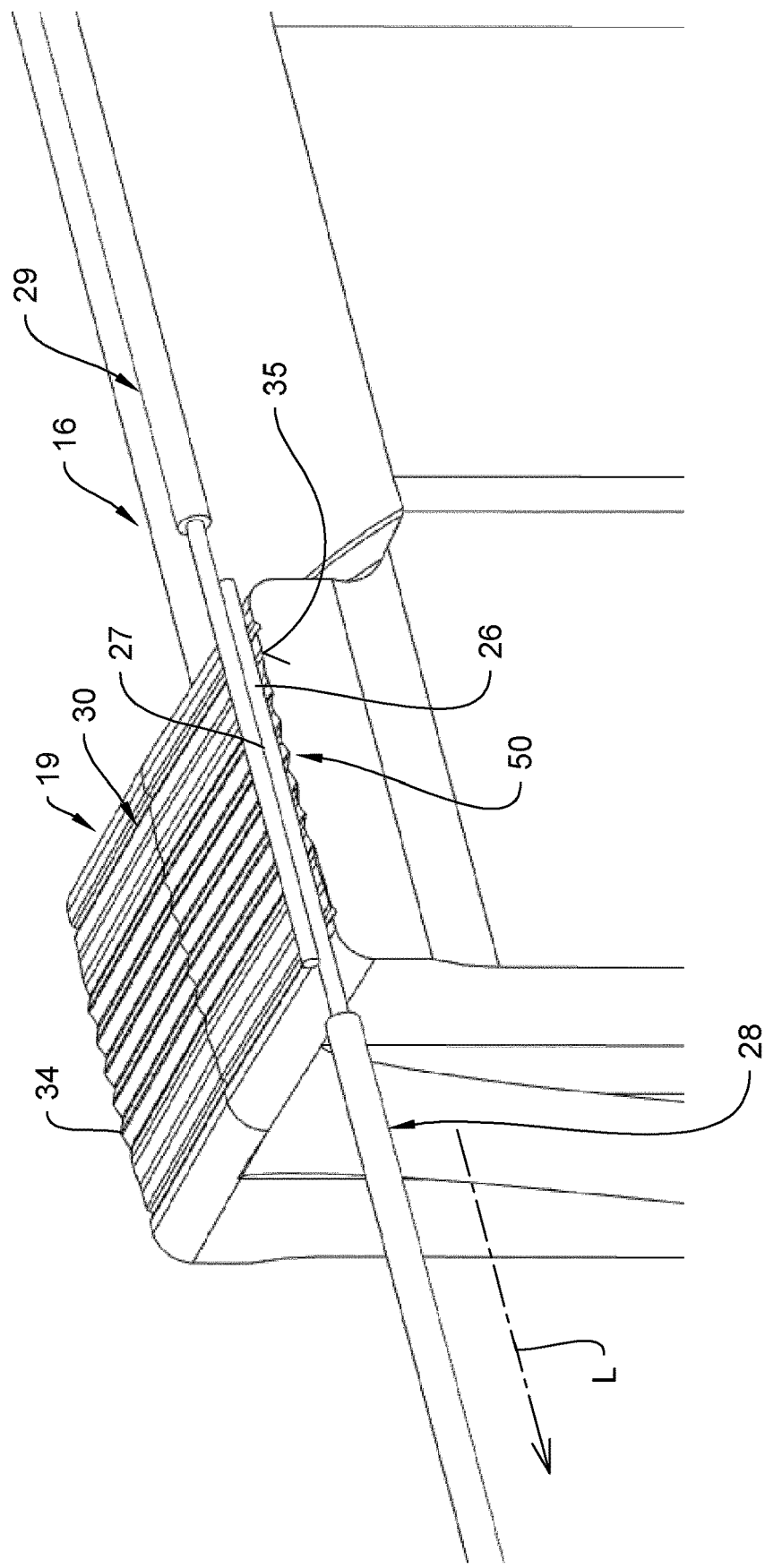
FIG. 3 shows an isometric illustration of a sonotrode with two connection regions disposed in a special contact zone for production of an in-line splice.

FIGS. 1 and 2 show the essential elements of a compression space 18 whose cross-section, i.e. height and width, is adjustable and which serves to receive connection regions 26, 27 of conductors 28, 29 extending in a first axial direction (x-axis). In a second axial direction (z-axis), compression space 18 is defined on two opposite sides by a working surface 19 of a sonotrode 16, which transmits ultrasonic vibrations, and by a counterface 20 of an anvil 21 displaceable in a third axial direction (y-axis). In the second axial direction, compression space 18 is defined on two opposite sides by a boundary surface 22 of a slider element 23 displaceable in the direction of the y-axis and by a boundary surface 24 of a boundary element 24 which, like anvil 21, is displaceable in the direction of the z-axis.

In the exemplary embodiment of compression space 18 illustrated in FIG. 1, two connection regions 26, 27 of conductors 28, 29 to be connected by means of sonotrode 16 are located on working surface 19 of sonotrode 16, connection regions 26, 27 being stacked on top of each other, FIG. 1 showing connection regions 26, 27 immediately after their placement in open compression space 18.

FIG. 2 shows compression space 18 in the closed configuration, in which the components defining compression space 18, i.e. sonotrode 16, anvil 21, slider element 23 and boundary element 25, have been displaced against one another in such a manner that compression space 18, which is now reduced in volume, forms a mold 40 which allows connection regions 26, 27 to be compressed and connected to each other to form a weld splice when connection regions 26, 27 of conductors 28, 29 are subjected to mechanical vibrations of sonotrode 16 in a friction welding process.

As can be seen from FIGS. 1 and 2, working surface 19 has a contact zone 30 and a special contact zone 31; in the case at hand, connection regions 26, 27 of conductors 28, 29 have a cross-section that is so small that connection region 26 of bottom conductor 28 is in contact solely with special contact zone 31 of working surface 19. Once compression space 18 has been put into the closed configuration illustrated in FIG. 2 and sonotrode 16 has been activated to produce ultrasonic vibrations, said ultrasonic vibrations are thus transmitted to connection region 26 in the area of special contact zone 31 only.

As clarified by the dash-dotted illustration of connection regions 32, 33, which have a significantly larger cross-section than connection regions 26, 27, a major portion of connection regions 32, 33 having that large a cross-section would be in contact with contact zone 30 of working surface 19 and only a relatively small portion would be in contact with special contact zone 31.

As can be seen from the illustrations in FIGS. 3 to 7, working surface 19 has a profiled surface configuration comprising profile elevations 34 which extend perpendicular to longitudinal axis L of sonotrode 16 across working surface 19. In special contact zones 31, 50, 51, 52 formed along a working surface edge 35, at least some of profile elevations 34 are provided with a special profile cross-section 36 which differs from a profile cross-section 37 of profile elevations 34 in the area of contact zone 30.

In the case of the exemplary embodiments illustrated in FIGS. 3 to 7, special profile cross-section 36 has a profile height that is reduced compared to profile cross-section 37 and that is formed by a flattened portion 38 of a profile peak 39 formed on profile cross-section 37 in the area of contact zone 30. Hence, flattened portions 38 form a "tamer" profile in special contact zone 31, resulting in less mechanical stress on connection region 26, which is the bottom one in FIGS. 3 and 4, when subjected to vibrations by sonotrode 16 in the longitudinal direction of sonotrode 16 than if connection region 26 was subjected to the "sharper" profile cross-section 37 of profile elevations 34 in contact zone 30.

Figure 4:
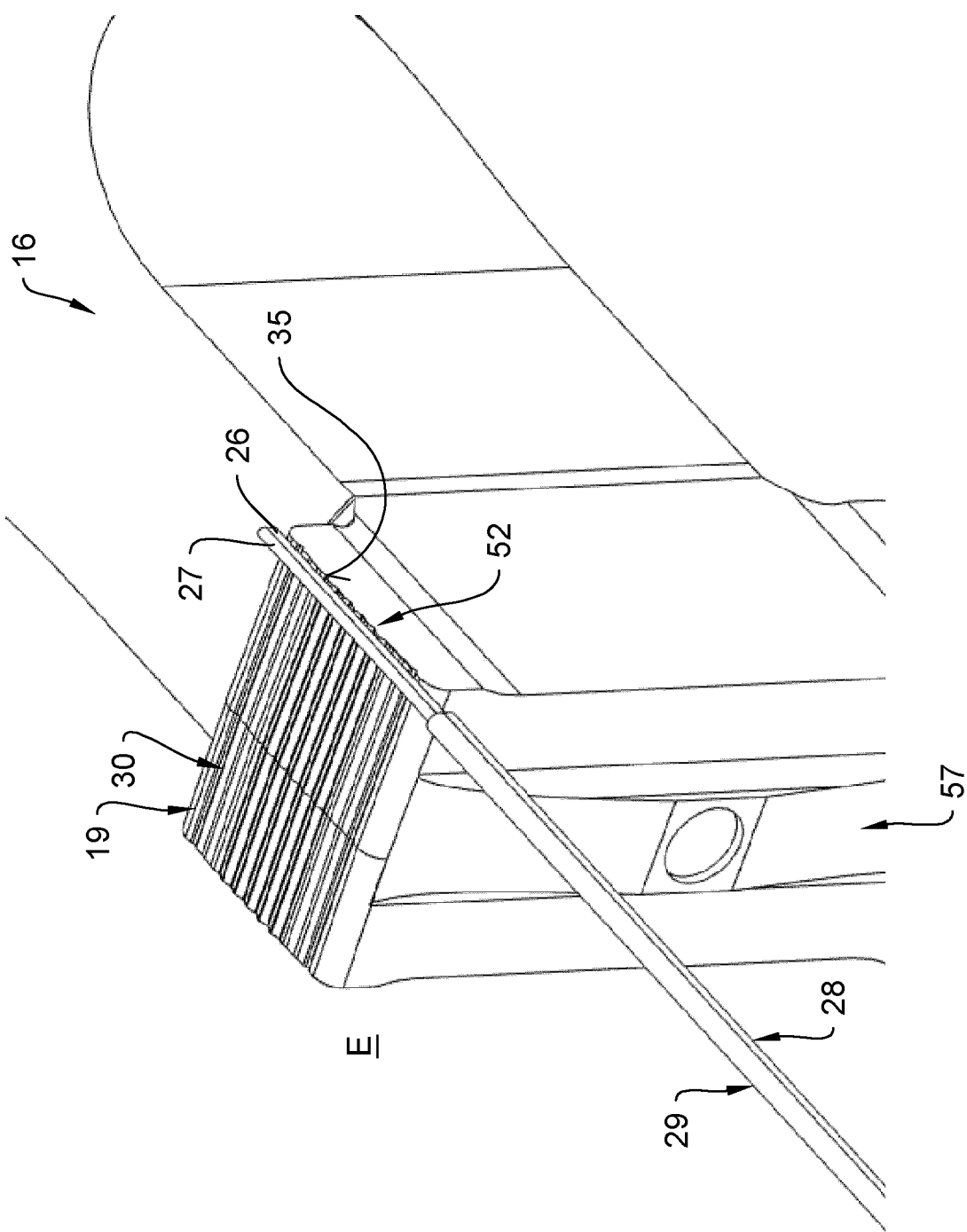
FIG. 4 shows an isometric illustration of a sonotrode with two connection regions disposed in a special contact zone for production of an end splice.
Figure 5:
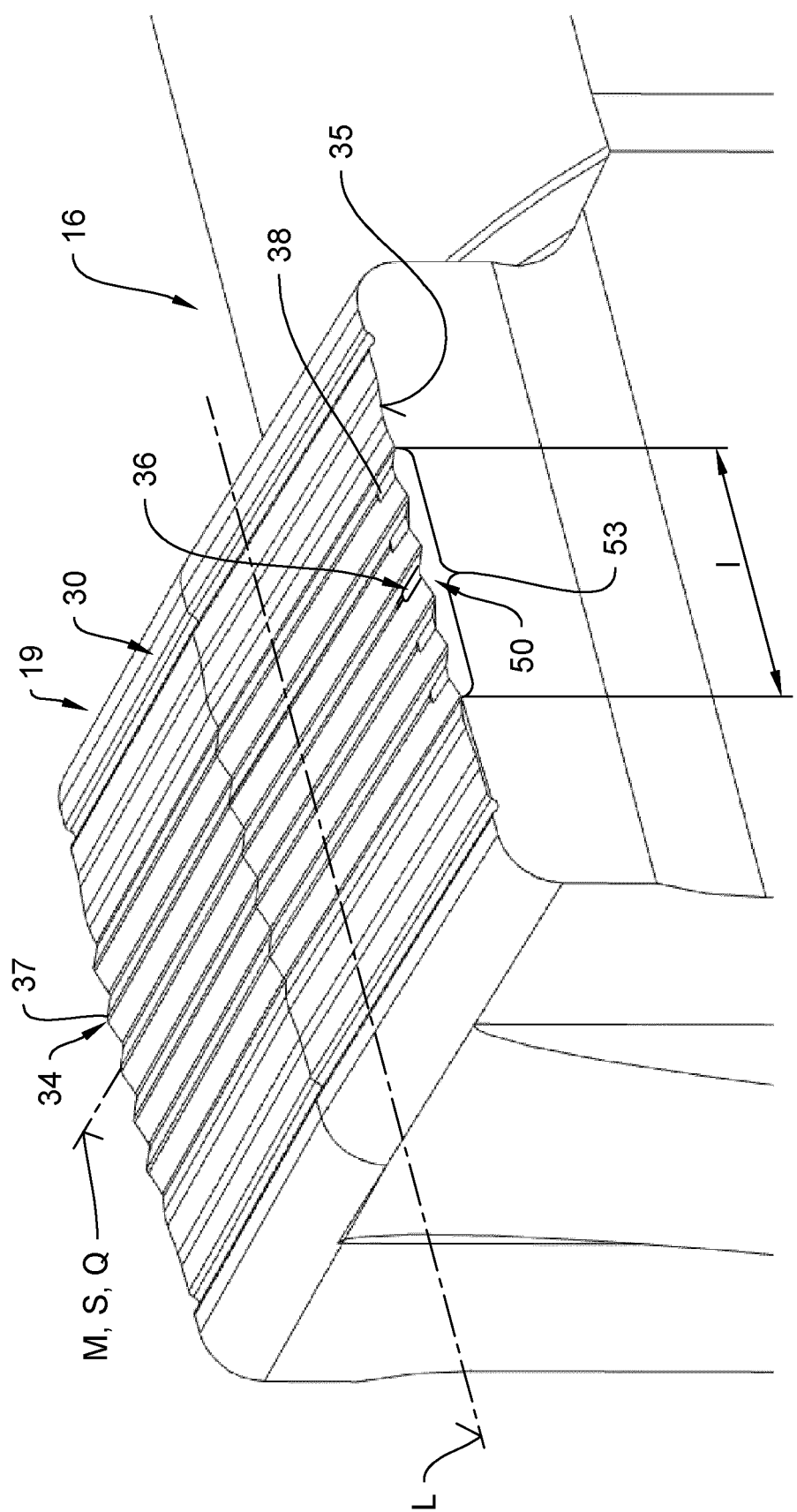
FIG. 5 shows an enlarged illustration of a working surface of the sonotrode illustrated in FIG. 3 with a first embodiment of a special contact zone formed on a working surface edge.

FIG. 3 shows the arrangement of conductors 28, 29 for producing an in-line splice, sonotrode 16 being provided with a special contact zone 50, which is shown enlarged in FIG. 5, on working surface 19. FIG. 4 shows the arrangement of conductors 28, 29 for producing an end splice, sonotrode 16 being provided with a special contact zone 52, which is shown enlarged in FIG. 7, on working surface 19.

FIG. 5 shows the configuration of special contact zone 50 with a special contact portion 53 which extends in the direction of longitudinal axis L and which is symmetric with respect to an axis of symmetry S disposed parallel to a transverse axis Q which is disposed at a right angle to longitudinal axis L in the case at hand. Since axis of symmetry S coincides with centerline M of working surface 19 in the case at hand, special contact zone 50 is thus symmetric across its entire length.

Figure 6:
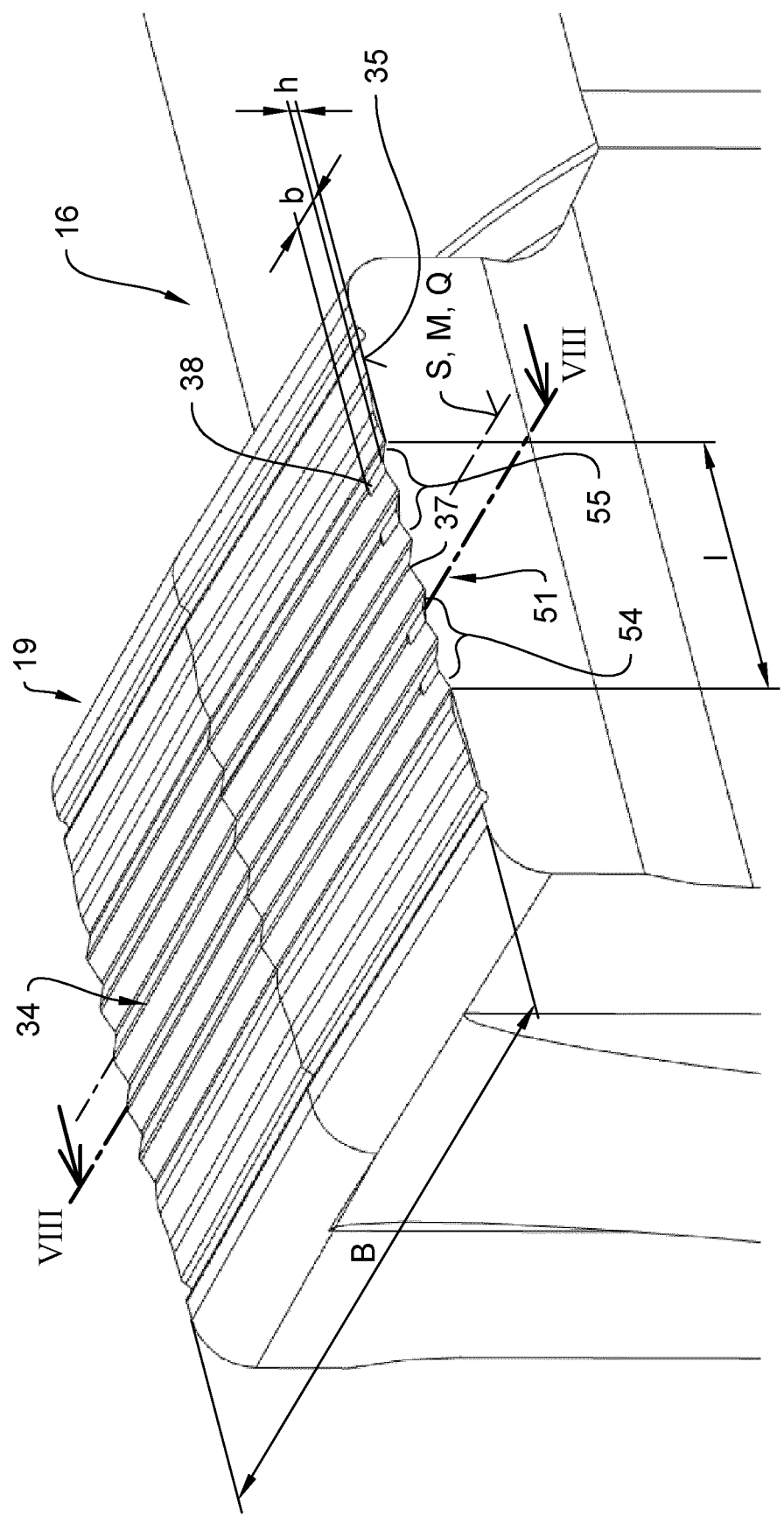
FIG. 6 shows an enlarged illustration of a working surface of the sonotrode illustrated in FIG. 3 with a second embodiment of a special contact zone formed on a working surface edge.

Unlike special contact zone 50, which is illustrated in FIG. 5, special contact zone 51, which is illustrated in FIG. 6, has a profile elevation 34, which is formed along axis of symmetry S and which is provided with constant profile cross-section 37 across the entire width B of working surface 19, in the area of axis of symmetry S, which again coincides with centerline M of working surface 19 in the case at hand. This results in two special contact portions 54, 55 which are separated by middle profile elevation 34; it has been found that a "middle tooth" thus formed by continuous profile elevation 34 allows a particularly high "peel strength" of the in-line splice when connection regions 26, 27 of conductors 28, 29 to be connected to each other are arranged according to FIG. 3.

Figure 7:
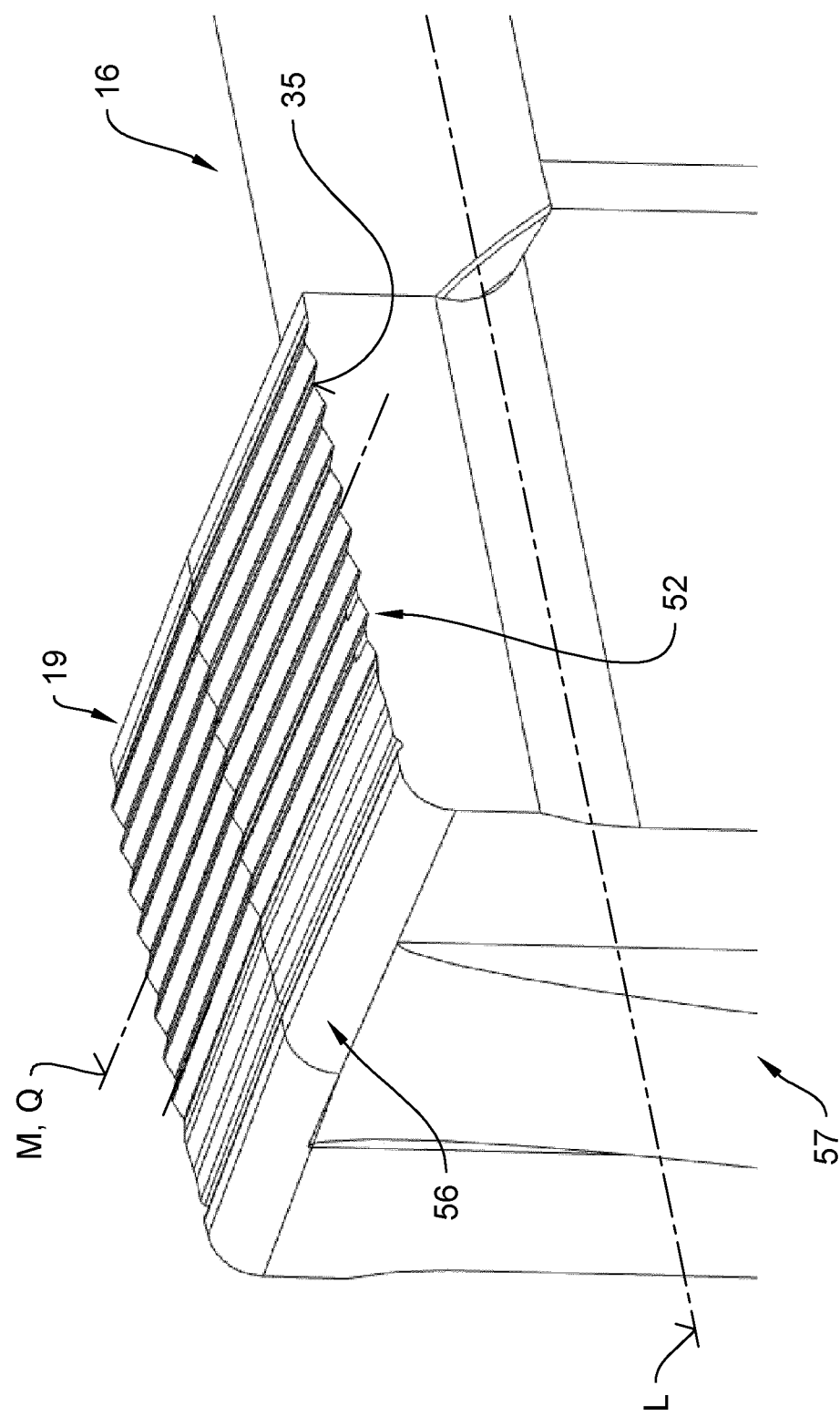
FIG. 7 shows an enlarged illustration of a working surface of the sonotrode illustrated in FIG. 3 with a third embodiment of a special contact zone formed on a working surface edge.

FIG. 7 shows a design of a special contact zone 52 that is particularly suitable for forming an end splice, the relative arrangement of connection regions 26, 27 on working surface 19 in special contact zone 52 illustrated in FIG. 4 being provided to form the end splice.

As shown in FIG. 7, special contact zone 52 is asymmetric with respect to centerline M of working surface 19, centerline M running parallel to transverse axis Q, which runs at a right angle to longitudinal axis L in the case at hand. Special contact zone 52 is disposed toward a working surface end 56, which is disposed at a free sonotrode end 57 in the case at hand. As can be seen from FIG. 4, in particular, a placement side E is thus defined in such a manner that in the case of the design or arrangement of special contact zone 52 in working surface 19 as illustrated in FIG. 7, connection regions 26, 27 which are to be connected to each other to form an end splice are best fed to working surface 19 of sonotrode 16 or introduced into compression space 18 illustrated in FIGS. 1 and 2 from the left to the right with respect to the depiction of sonotrode 16 in FIG. 4.

Figure 8:
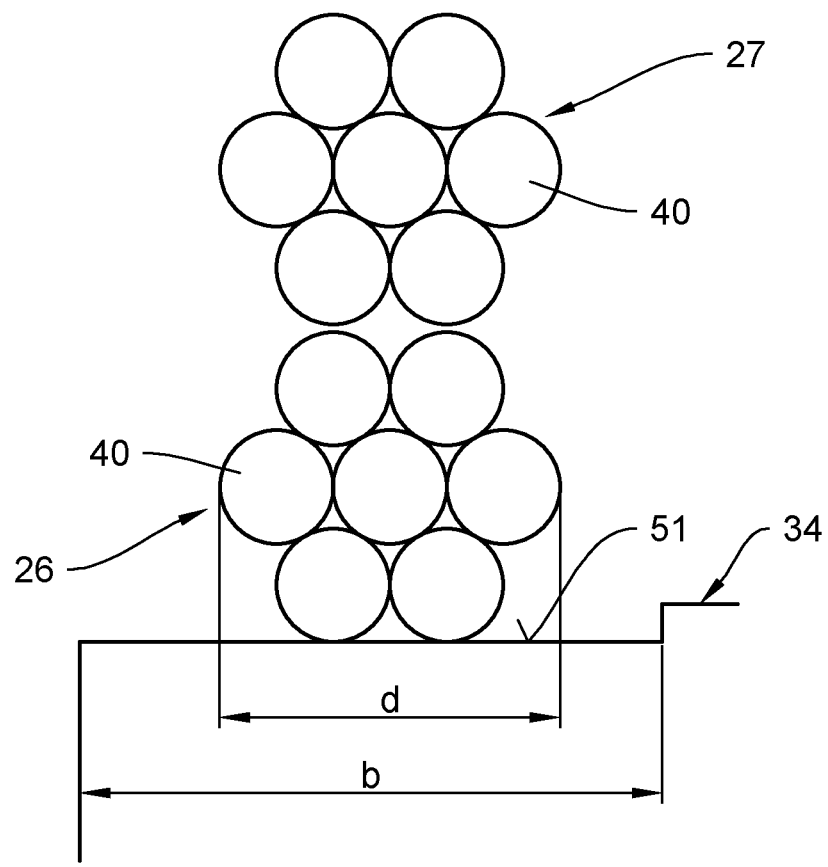
FIG. 8 is a schematic illustration showing the arrangement of the connection regions on the special contact zone illustrated in FIG. 6 in a sectional view according to line VIII-VIII in FIG. 4.

FIG. 8 clarifies the arrangement of bottom connection region 26 on special contact zone 51 illustrated in FIG. 6, a width b of special contact zone 51 in a direction perpendicular to longitudinal axis L of sonotrode 16 and in the longitudinal direction of profile elevations 34 clearly being designed according to diameter d of connection region 26, which is composed of seven individual wires 40 or conductors in the case at hand. In the exemplary embodiment shown, the diameter of the individual wires 40 is about 0.158 mm, the diameter of connection region 26 thus being about 0.5 mm.

In the case at hand, width b of special contact zone 51 is selected slightly wider than the diameter of connection region 26, which ensures that connection region 26 is in contact with working surface 19 of sonotrode 16 in the area of special contact zone 51 only.

The invention claimed is:

1. A device for welding rod-shaped electrical conductors (28, 29), the device comprising a compression space (18) for receiving two connection regions (26, 27) of the conductors (28, 29) to be connected, the connection regions (26, 27) extending in a first axial direction (x-axis), the compression space (18) being defined by a working surface (19) of a sonotrode (16), which transmits ultrasonic vibrations, and a counterface (20) of an anvil (21) at two opposite sides in a second axial direction (z-axis) and by a boundary surface (22) of a slider element (23), which is displaceable in a third axial direction (y-axis), and a boundary surface (24) of a boundary element (25) on two opposite sides in the third axial direction (y-axis), wherein in a special contact zone (31, 50, 51, 52), which is a section of the working surface (19) of the sonotrode (16) and serves to subject at least one connection region (26, 27) to ultrasonic vibrations, the working surface (19) has a surface configuration that differs from a contact zone (30) formed by the remaining working surface (19), wherein the special contact zone (31, 50, 51, 52) is disposed adjacent to the boundary element (25); the special contact zone (31, 50, 51, 52) is formed on a working surface edge (35) parallel to the boundary element (25) and in that the contact zone (30) has a surface configuration comprising profile elevations (34) which extend in the third axial direction (y-axis) and at least some of which have a special profile cross-section (36), which differs from a profile cross-section (37) in the contact zone (30), in the area of the special contact zone (31, 50, 51, 52).

2. The device according to claim 1, wherein the special profile cross-section (36) has a reduced profile height h compared to the profile cross-section (37).

3. The device according to claim 2, wherein the reduced profile height h is formed by a flattened portion (38) or a rounded portion of a profile peak (39) of the profile cross-section (37).

4. The device according to claim 1, wherein at least in a middle portion extending in the first axial direction (x-axis), the special contact zone (50, 51) has a special contact portion (53, 54, 55) which is symmetric with respect to an axis of symmetry S running parallel to the third axial direction (y-axis).

5. The device according to claim 4, wherein the special contact zone (50, 51) is symmetric across its entire length.

6. The device according to claim 4, wherein the axis of symmetry S is formed by a centerline M of the working surface, said centerline M running parallel to the third axial direction (y-axis).

7. The device according to claim 4, wherein the special contact zone (51) is discontinuous.

8. The device according to claim 7, wherein at least one profile elevation (34) formed in the area of the axis of symmetry S extends across an entire width B of the working surface (19).

9. The device according to claim 4, wherein the special contact zone (31, 50, 51, 52) extends across only part of the length of the contact zone (30) in the first axial direction (x-axis).

10. The device according to claim 9, wherein the special contact zone (52) is asymmetrical with respect to a centerline M of the working surface (19), said centerline M running parallel to the third axial direction (y-axis).

11. The device according to claim 10, wherein the special contact zone (52) is disposed toward a working surface end (56).

12. The device according to claim 4, wherein the special contact zone (31, 50, 51, 52) has a width of less than 2 mm in the third axial direction (y-axis).

13. The device according to claim 12, wherein the special contact zone (31, 50, 51, 52) has a width of less than 1.5 mm in the third axial direction (y-axis).

14. The device according to claim 13, wherein the special contact zone (31, 50, 51, 52) has a width of less than 1 mm in the third axial direction.

15. A sonotrode (16) for a device for welding rod-shaped electrical conductors (28, 29), wherein in a special contact zone (31, 50, 51, 52), which is a section of the working surface (19) of the sonotrode (16) and serves to subject at least one connection region (26, 27) of an electrical conductor (28, 29) to ultrasonic vibrations, the working surface (19) has a surface configuration that differs from a contact zone (30) formed by the remaining working surface (19), wherein the special contact zone (31, 50, 51, 52) extends in the direction of a longitudinal axis L of the sonotrode; the special contact zone (31, 50, 51, 52) is formed on a working surface edge (35) of the sonotrode (16) and in that the contact zone (30) has a surface configuration comprising profile elevations (34) which extend perpendicular to the longitudinal axis L of the sonotrode (16) and which have a special profile cross-section (36), which differs from a profile cross-section (37) in the contact zone (30), in the area of the special contact zone (31, 50, 51, 52).

16. The sonotrode according to claim 15, wherein at least one profile elevation (34) formed in an area of an axis of symmetry S extends across an entire width B of the working surface (19).

17. The sonotrode according to claim 15, wherein the special profile cross-section (36) has a reduced profile height h compared to the profile cross-section (37).

* * * * *